Patented Mar. 6, 1951

2,543,852

UNITED STATES PATENT OFFICE 2,543,852

SURFACE ACTIVE DERIVATIVES OF NITROGEN-CONTAINING SULFONIC ACIDS

Gaston Jaccard, Basel, Switzerland, assignor to Sandoz Limited, Basel, Switzerland, a Swiss firm No Drawing. Application October 24, 1947, Serial No. 782,010. In Switzerland October 29, 1946

10 Claims. (Cl. 260—401)

The present invention relates to a new class of surface active sulfonic acid derivatives suitable as assistance for the textile and related industries and particularly of cleansing, dispersing, wetting and softening agents and to a process for the production thereof.

I have found that excellent assistants for the textile and related industries and particularly cleansing, dispersing, wetting and softening agents are obtained by reacting an amide of the general formula

in which R denotes a straight or branched saturated or unsaturated alkyl or cycloalkyl radical with at least 10 carbon atoms, $R_1$ denotes an alkylene or hydroxyalkylene radical containing 2-6 carbon atoms, $R_2$ denotes an alkyl or hydroxyalkyl radical with 1-6 carbon atoms, with a compound of the general formula $XR_3SO_3Y$, in which $R_3$ denotes an alkylene or hydroxyalkylene radical with 2-6 carbon atoms, of which the carbon chain can be interrupted by hetero atoms or hetero atom groups, X denotes an exchangeable atom or radical or an internal ether-oxygen atom and Y denotes a cation.

Suitable amides of the formula

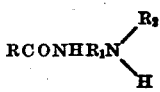

are for instance those obtained by the reaction between soap-forming fatty acids with monoethyl- or monohydroxyethylethylenediamine, monomethyl- or monohydroxyethylaminopropylamine or alpha,beta-dihydroxypropylaminoethylamine.

As compounds of the formula $XR_3SO_3Y$ may be mentioned for example: alkali salts of halogenethane-sulfonic acids or ethionsulfonic acid, carbyl sulfate, water-soluble salts of the chlorhydroxypropanesulfonic acids, the acid of the formula

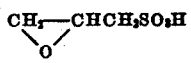

and chlorethoxyethanesulfonic acids.

The reaction can take place in aqueous solution or in the presence of a non aqueous solvent, either under normal, elevated or reduced pressure, advantageously at temperatures between 50–120° C. and a slightly alkaline reaction.

The products obtained, which are one object of the present invention, corresponds to the formula

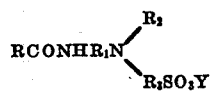

in which the radicals R, $R_1$, $R_2$, $R_3$ and Y have the same definition as given above. In the case, where in the formula given RCO- denotes the radical of a soap-forming natural fatty acid, such as stearic, palmitic, oleic or cocoanut fatty acids, or of a soap-forming synthetic carboxylic acid, $R_2$ denotes the methyl-, ethyl-, propyl-, hydroethyl-, hydroxypropyl-radical and $R_3$ denotes the ethylene, propylene or hydroxypropylene radicals, the products are particularly suitable as cleansing and dispersing agents.

The products of the present invention are generally characterized by excellent detergent properties in neutral, acid or alkaline baths. They possess high stability in hard water. Consequently these products constitute highly valuable assistants for all the branches of the textile industries and all industries in which it is desired to obtain a foaming, cleansing, wetting, dissolving, penetrating, dispersing or emulsifying action. They can be used in dry state as powders, flakes or in any other shaped forms or in the state of pastes or they may be mixed with diluents or other surface active materials such as soaps, fatty alcohol sulfonates or superfatting agents, such as for instance fatty acids, fatty alcohols, lanoline etc.

The following examples illustrates how the invention can be carried out in practice, but are in no way limitative. The parts are by weight.

*Example 1*

35 parts of an amide obtained by conventional methods from technical stearic acid and an equimolecular quantity of monohydroxyethylethylene-diamine are mixed in portions with a total quantity of 60 parts of a 40% aqueous solution of gamma-chlor-beta-hydroxypropane-alphasulfonic acid and 16 parts of 30% caustic soda solution and heated in a rotating autoclave for several hours at 120° C. After the completion of the reaction, the product is dried, if desired standardised with an inorganic water-soluble salt and pulverised. It forms a white slightly hydroscopic powder, chiefly consisting of the compound

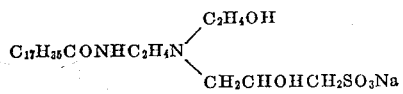

and the corresponding palmitic acid derivative of the formula

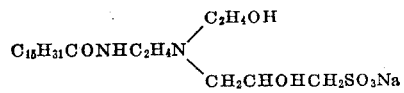

It can also be used in the form of a paste and is particularly suitable for neutral or acid wool washing. It also has an excellent power for emulsifying calcium soaps.

Products having a similar action and corresponding to the formula

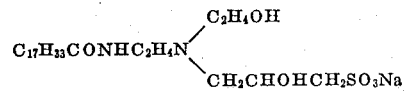

are obtained by replacing the technical stearic acid by technical oleic acid.

*Example 2*

37 parts of the amide which is obtainable from oleic acid and an equimolecular quantity of monohydroxyethylethylenediamine are mixed with 51 parts of a 40% aqueous solution of sodium beta-chlorethanesulfonate and 16 parts of 30% caustic soda solution and heated for some hours in a rotating autoclave at 120° C. The product consists chiefly of the compound

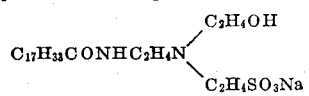

It can be used for the same purposes as the substance obtained according to the above Example 1. If the sodium-beta-chlorethane sulfonate is replaced by an equivalent quantity of sodium chlorethoxyethanesulfonate, a similar product is obtained.

*Example 3*

32 parts of the glycerine-containing amide obtained from cocoanut fat and the equivalent quantity of monohydroxyethylethylene-diamine are mixed with 60 parts of a 40% aqueous solution of sodium gamma-chlor-beta-hydroxypropane-alpha-sulfonate and 16 parts of 30% caustic soda solution and heated for several hours at 100° C. The resultant thick fluid product dissolves in water with considerable foaming and has good wetting properties. It consists chiefly of the compound of the formula

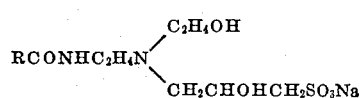

wherein R denotes the alkyl radical of the fatty acids present in cocoanut fat. It can be used for the preparation of hair washing lotions.

What I claim is:

1. A process for the preparation of a surface active derivative of a nitrogen-containing aliphatic sulfonic acid, which comprises reacting, at a temperature between 50° C. and 120° C. under alkaline conditions, an amide of the formula

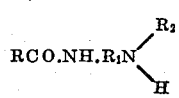

wherein R denotes a hydrocarbon radical, with 10 to 24 carbon atoms, selected from the class consisting of saturated and unsaturated straight chain and branched chain aliphatic hydrocarbon and cycloaliphatic hydrocarbon radicals, $R_1$ denotes an aliphatic radical selected from the group consisting of alkylene and hydroxyalkylene radicals containing 2 to 6 carbon atoms, and $R_2$ denotes an aliphatic radical selected from the group consisting of alkyl and hydroxyalkyl radicals containing 1 to 6 carbon atoms, with an equimolecular proportion of a compound of the formula

wherein $R_3$ denotes an aliphatic radical, with 2 to 6 carbon atoms, selected from the class consisting of the alkylene and hydroxyalkylene radicals, X denotes a member selected from the group consisting of halogen, sulfuric acid ester, sulfonic acid ester and internal ether-oxygen groups, and Y denotes a cation.

2. A process for the preparation of a surface active derivative of a nitrogen-containing aliphatic sulfonic acid, which comprises reacting, at a temperature between 50° C. and 120° C. under alkaline conditions, the amide of technical stearic acid with an equimolecular proportion of the sodium salt of gamma-chlor-beta-hydroxypropane-alpha-sulfonic acid.

3. A process for the preparation of a surface active derivative of a nitrogen-containing aliphatic sulfonic acid, which comprises reacting, at a temperature between 50° C. and 120° C. under alkaline conditions, the amide of technical oleic acid with an equimolecular proportion of the sodium salt of gamma-chlor-beta-hydroxypropane-alpha-sulfonic acid.

4. A surface active sulfonic acid derivative of the formula

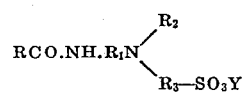

wherein R denotes a hydrocarbon radical, with 10 to 24 carbon atoms, selected from the class consisting of saturated and unsaturated straight chain and branched chain aliphatic hydrocarbon and cycloaliphatic hydrocarbon radicals, $R_1$ denotes an aliphatic radical selected from the group consisting of alkylene and hydroxyalkylene radicals containing 2 to 6 carbon atoms, $R_2$ denotes an aliphatic radical selected from the group consisting of alkyl and hydroxyalkyl radicals containing 1 to 6 carbon atoms, $R_3$ denotes an alpihatic radical, with 2 to 6 carbon atoms, selected from the class consisting of the alkylene and hydroxyalkylene radicals, and Y denotes a cation.

5. A surface active sulfonic acid derivative of the formula

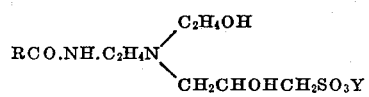

wherein R denotes an aliphatic hydrocarbon radical with 10 to 24 carbon atoms and Y denotes a cation.

6. A surface active sulfonic acid derivative of the formula

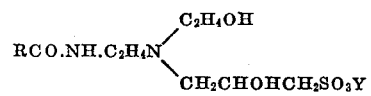

wherein RCO is the acyl radical of an animal oil fatty acid and Y denotes a cation.

7. A surface active sulfonic acid derivative of the formula $$RCO.NH.C_2H_4N \begin{cases} C_2H_4OH \\ CH_2CHOHCH_2SO_3Y \end{cases}$$

wherein RCO is the acyl radical of a vegetable oil fatty acid and Y denotes a cation.

8. The surface active sulfonic acid salt of the formula $$C_{17}H_{35}CONHC_2H_4N \begin{cases} C_2H_4OH \\ CH_2CHOHCH_2SO_3Na \end{cases}$$

9. The surface active sulfonic acid salt of the formula $$C_{15}H_{31}CONHC_2H_4N \begin{cases} C_2H_4OH \\ CH_2CHOHCH_2SO_3Na \end{cases}$$

10. The surface active sulfonic acid salt of the formula $$C_{17}H_{33}CONHC_2H_4N \begin{cases} C_2H_4OH \\ CH_2CHOHCH_2SO_3Na \end{cases}$$

GASTON JACCARD.

REFERENCES CITED

The following references are of record in the file of this patent:

UNITED STATES PATENTS

| Number | Name | Date |
|---|---|---|
| 2,008,649 | Ulrich et al. | July 16, 1935 |
| 2,279,497 | Sallmann et al. | Apr. 14, 1942 |
| 2,387,572 | Flett | Oct. 23, 1945 |
| 2,388,154 | Katzman | Oct. 30, 1945 |